(12) United States Patent
Tso et al.

(10) Patent No.: US 10,449,546 B2
(45) Date of Patent: Oct. 22, 2019

(54) SHREDDER BIN-FULL DEVICE

(71) Applicant: Aurora Office Equipment Co., Ltd. Shanghai, Shanghai (CN)

(72) Inventors: Yung Kang Tso, Shanghai (CN); Xiuming Liu, Shanghai (CN)

(73) Assignee: Aurora Office Equipment Co., Ltd. Shanghai, Shanghai (CN)

( * ) Notice: Subject to any disclaimer, the term of this patent is extended or adjusted under 35 U.S.C. 154(b) by 196 days.

(21) Appl. No.: 15/717,576

(22) Filed: Sep. 27, 2017

(65) Prior Publication Data
US 2018/0017425 A1    Jan. 18, 2018

Related U.S. Application Data

(63) Continuation-in-part of application No. 14/553,899, filed on Nov. 25, 2014, now Pat. No. 9,981,268, and (Continued)

(30) Foreign Application Priority Data

Jan. 15, 2013  (CN) .......................... 2013 1 0014035
Jan. 15, 2013  (CN) .......................... 2013 1 0014059
Jan. 15, 2013  (CN) .......................... 2013 1 0014063

(51) Int. Cl.
*B02C 25/00* (2006.01)
*B02C 18/00* (2006.01)
(Continued)

(52) U.S. Cl.
CPC .......... *B02C 18/0007* (2013.01); *B02C 18/16* (2013.01); *B02C 18/2216* (2013.01); (Continued)

(58) Field of Classification Search
CPC ............... B02C 23/04; B02C 18/0007; B02C 2018/0015; B02C 2018/0023; B02C 2018/168; B02C 25/00
(Continued)

(56) References Cited

U.S. PATENT DOCUMENTS 6,978,954 B2 *  12/2005  Kroger ............... B02C 18/0007
                                                        241/100
7,204,441 B1 *   4/2007  Hartnett ............ B02C 18/0007
                                                        241/100

(Continued)

*Primary Examiner* — Faye Francis
(74) *Attorney, Agent, or Firm* — WHGC, P.L.C.; John F. O'Rourke

(57) ABSTRACT

A paper shredder bin-full sensor with a push bar, a conductive element coupled to the push bar, a sensing contact assembly normally set apart from the conductive element, and a signaling contact coupled to the sensing contact assembly. Sensor includes a push bar sweeper between the conductive element and the push bar, and a biasing element coupled to the push bar sweeper, the biasing element elastically resists the shredded material force. A predetermined shredded material force presses the push bar, causing the conductive element to couple to the sensing contact assembly, in turn causing a waste bin-full signal to emanate. Push bar can be articulated and non-articulated. Articulated push bars include upper and lower push bars, and respective tensioning element connecting the respective upper and lower push bars. Lower push bar is extended from upper push bar. Paper shredder can have articulated or non-articulated push bars.

6 Claims, 8 Drawing Sheets

Related U.S. Application Data a continuation-in-part of application No. 13/850,993, filed on Mar. 26, 2013, now Pat. No. 9,643,190.

(51) Int. Cl.

| | | |
|---|---|---|
| *G01F 23/16* | (2006.01) | |
| *B02C 18/16* | (2006.01) | |
| *B02C 18/22* | (2006.01) | |
| *B02C 23/04* | (2006.01) | |
| *G01F 23/36* | (2006.01) | |
| *G01F 22/00* | (2006.01) | |

(52) U.S. Cl.
CPC .............. *B02C 23/04* (2013.01); *G01F 22/00* (2013.01); *G01F 23/16* (2013.01); *G01F 23/363* (2013.01); *B02C 2018/164* (2013.01); *B02C 2018/168* (2013.01)

(58) Field of Classification Search
USPC .................................................. 241/36, 37.5
See application file for complete search history.

(56) References Cited

U.S. PATENT DOCUMENTS

| | | | | |
|---|---|---|---|---|
| 7,213,777 | B2* | 5/2007 | Podrovitz | B02C 18/0007 241/100 |
| 7,497,393 | B2* | 3/2009 | Abramson | B02C 18/0007 241/100 |
| 8,167,223 | B2* | 5/2012 | Jensen | B02C 18/0007 241/100 |
| 9,463,465 | B2* | 10/2016 | Castronovo | B02C 19/0056 |
| 9,643,190 | B2* | 5/2017 | Liu | B02C 23/04 |
| 9,981,268 | B2* | 5/2018 | Tso | B02C 23/04 |
| 2003/0042342 | A1* | 3/2003 | Kroger | B02C 18/0007 241/36 |
| 2007/0228196 | A1* | 10/2007 | Abramson | B02C 18/0007 241/37.5 |
| 2010/0032505 | A1* | 2/2010 | Jensen | B02C 18/0007 241/25 |
| 2013/0062444 | A1* | 3/2013 | Jensen | B02C 25/00 241/30 |

* cited by examiner

SHREDDER BIN-FULL DEVICE

CROSS-REFERENCE TO RELATED PATENTS

This application is a Continuation-in-Part of U.S. application Ser. No. 14/553,899, entitled "SAFETY SHREDDER WITH MECHANICAL BIN-FULL DEVICE," filed Nov. 25, 2014, which is a Continuation-in-Part of U.S. application Ser. No. 13/850,993, now U.S. Pat. No. 9,643,190, issued May 9, 2017, entitled "SAFETY SHREDDER WITH BIN-FULL DEVICE AND TIME DELAY," filed Mar. 26, 2013, which claims priority of Jan. 15, 2013 to CN201310014059.1, CN201310014035.6, and CN201310014063.8 (all filed the same day), with each of the foregoing being hereby incorporated by reference in its respective entirety.

BACKGROUND

1. Field of the Invention

The present invention generally pertains to paper shredders and, particularly, to bin-full devices for paper shredders.

2. Background Art

The shredder is a machine that is commonly used to destroy confidential or personal documents. Generally, the shredder comprises a paper-shredding device and a waste bin. A fully-filled waste bin makes it difficult to continue the paper shredding, and high-piled scraps easily impair current bin-full detection devices. The existing paper-full detection devices chiefly comprise three types: a mechanical type, an electronic type, and an optical type. The electronic bin-full detection device is fairly expensive and unstable. The existing mechanical bin-full detection devices have the shortcomings of being complicated in structure and inflexible to use. One mechanical bin-full detection senses the paper filling state of the paper shredder by combining a paper filling plate as long as a paper outlet with a microswitch. Because the paper filling plate is long and needs to be lower than the middle portion of the paper outlet, the touch stroke of the microswitch is limited, the touch efficiency is low, and the sensitivity is low. The optical bin-full detection device also is fairly expensive, can be prone to malfunction if the optical sensors become blocked or dirty. What is needed is a bin-full device that obviates the foregoing problems.

SUMMARY

The embodiments herein provide a simple, inexpensive, and durable solution by implementing an electromechanical bin-full detector.

Provided are embodiments of a shredder sensor for a paper shredder, which can have a push bar with an obverse side and a reverse side, a conductive element mechanically coupled to the reverse side of the push bar, a sensing contact assembly adjacent to and normally set apart from the conductive element, and a signaling contact electrically coupled to the sensing contact assembly. Selected embodiments further include a push bar sweeper coupled between the reverse side of the push bar and the conductive element, the push bar sweeper having a near end and a far end, wherein the far end is coupled to the reverse side of the push bar, and a biasing element coupled to the push bar sweeper far end, wherein the biasing element elastically resists a shredded material force. The shredded material force presses the obverse side of the push bar, causing the conductive element to electrically couple to the sensing contact assembly, in turn causing a bin-full signal to emanate from the signaling contacts.

Embodiments also include a shredder lower shroud, and an opening in the shredder lower shroud formed to accommodate the push bar, wherein the obverse side of the push bar is disposed at least partly within the opening in the shredder lower shroud. In embodiments, a predetermined shredded material force presses the obverse side of the push bar, causing the conductive element to electrically couple to the sensing contact assembly, in turn causing a bin-full signal to emanate from the signaling contacts. In certain embodiments, the push bar and the push bar sweeper are non-conductive. Also included can be a waste bin configured to receive a portion of the shredder lower shroud, the waste bin receiving shredded material, wherein a predetermined level of shredded material in the waste bin corresponds to a predetermined shredded material force, and the predetermined shredded material force causes the bin-full signal to emanate, wherein the bin-full signal causes a motor of the paper shredder to stop. In embodiments, the push bar has a top portion and a bottom portion, with the top portion including a pivoting portion, wherein the predetermined shredded material force causes the push bar to pivot around the pivoting portion.

Also provided is a shredder sensor for a paper shredder, including an articulated push bar having an obverse side and a reverse side, a conductive element mechanically coupled to the reverse side of the push bar, a sensing contact assembly adjacent to and normally set apart from the conductive element, and a signaling contact electrically coupled to the sensing contact assembly. Embodiments also can include a push bar sweeper coupled between a reverse side of the articulated push bar and the conductive element, the push bar sweeper having a near end and a far end, wherein the far end is coupled to the reverse side of the articulated push bar and the near end is coupled to a conductive element, and an elastic biasing element coupled to the push bar sweeper far end, wherein the elastic biasing element elastically resists a predetermined shredded material force, wherein the predetermined shredded material force presses the obverse side of the articulated push bar, causing the conductive element to electrically couple to the sensing contact assembly, in turn causing a bin-full signal to emanate from the signaling contacts. In some embodiments, an articulated push bar includes an upper push bar with a guide slot, a lower push bar mechanically coupled to the upper push bar using the guide slot, and an adjustable tensioning element disposed in the lower push bar, wherein the lower push bar is extended from or retracted to the upper push bar by adjusting the adjustable tensioning element. In embodiments, the lower push bar further includes a lower pivoting portion disposed within the guide slot, and wherein the lower push bar can be extended, retracted, or pivoted. In alternative embodiments, an articulated push bar includes an upper push bar with a guiding hole, a lower push bar mechanically coupled to the upper push bar using the guiding hole, and an adjustable tensioning element positioned at least partially through the guiding hole into the lower push bar, wherein the lower push bar is angled relative to the upper push bar by adjusting the adjustable tensioning element. Alternative embodiments can include a lower pivoting portion coupled to the adjustable tensioning element, wherein the lower push bar can be adjustably pivoted relative to the upper push bar and releasably positioned to a selected angle.

Additionally provided is a paper shredder having a motor, a cutting block mechanically coupled to the motor, a shredder controller electrically coupled to the motor, the shredder controller configured to stop the motor when a bin-fill signal is received, and a shredder sensor, having a push bar with an obverse side and a reverse side, a conductive element mechanically coupled to the reverse side of the push bar, a sensing contact assembly adjacent to and normally set apart from the conductive element, a signaling contact electrically coupled to the sensing contact assembly, a push bar sweeper coupled between the reverse side of the push bar and the conductive element, the push bar sweeper having a near end and a far end, wherein the far end is coupled to the reverse side of the push bar, and a biasing element coupled to the push bar sweeper far end. The biasing element elastically resists a shredded material force, and the shredded material force corresponds to a predetermined waste bin level. The shredder material force presses the obverse side of the push bar, causing the conductive element to electrically couple to the sensing contact assembly, in turn causing the bin-full signal to emanate from the signaling contacts and to be received by the controller. Embodiments also include a lower shroud mechanically coupled to the motor, the cutting block, and the controller, an opening in the lower shroud, formed to accommodate the push bar, and a waste bin removably coupled to the lower shroud, wherein the push bar extends at least in part from the opening in the lower shroud, and wherein when shredded material reaches a predetermined level in the waste bin, the push bar is positioned to cause the bin-full signal to emanate from the signaling contact. In some embodiments, the push bar is an articulated push bar. The articulated push bar includes an upper push bar with a guide slot, a lower push bar mechanically coupled to the upper push bar using the guide slot, and an adjustable tensioning element disposed in the lower push bar, wherein the lower push bar is extended from or retracted to the upper push bar by adjusting the adjustable tensioning element. In other embodiments, the push bar is an articulated push bar. The articulated push bar includes an upper push bar with a guiding hole, a lower push bar mechanically coupled to the upper push bar using the guiding hole, and a adjustable tensioning element positioned at least partially through the guiding hole into the lower push bar, wherein the lower push bar is angled relative to the upper push bar by adjusting the adjustable tensioning element.

BRIEF DESCRIPTION OF THE DRAWINGS

Embodiments of the present invention disclosed herein are illustrated by way of example, and are not limited by the accompanying figures, in which like references indicate similar elements, and in which.

Skilled artisans can appreciate that elements in the figures are illustrated for simplicity and clarity and have not necessarily been drawn to scale. For example, the dimensions of some of the elements in the figures may be exaggerated relative to other elements to help improve the understanding of the embodiments of the present invention. In the figures, like numbers correspond to like elements.

DESCRIPTION OF THE EMBODIMENTS

Figure 1:
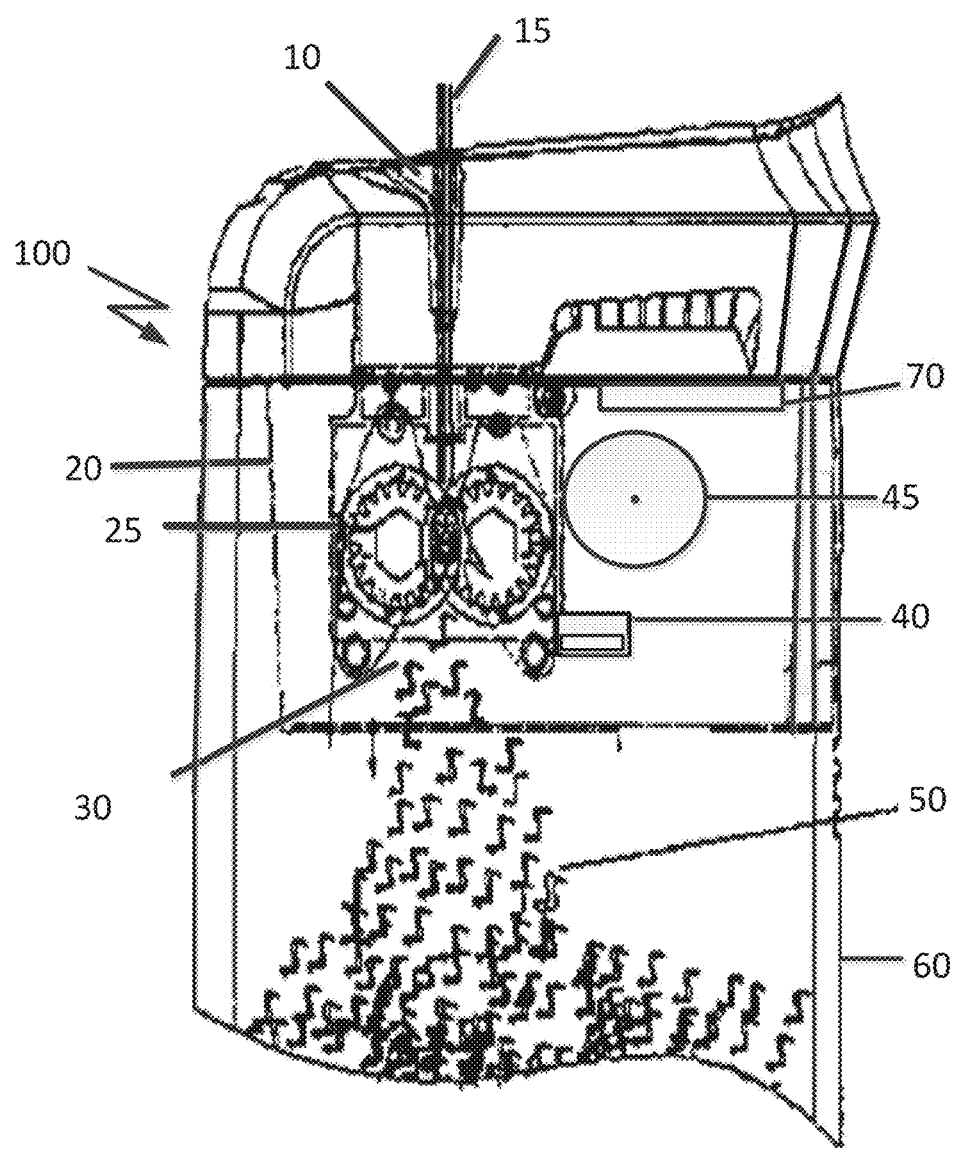
FIG. 1 is an illustration of a cross-section of a paper shredder, in accordance with the teachings of the present invention.

Typically, as shown in FIG. 1, shredder 100 includes shredder element 20, bin-full sensor 40, and waste bin 60. Shredder element 20 generally includes shredder inlet 10, cutting block 25, a shredder outlet 30, and controller 70. Cutting block 25 has blades driven by an electric motor 45. Shredder input 10 receives shreddable material, shreddables 15. Shredder output 30 discharges the shredded material, shreddant 50, when electric motor 45 is operating. Waste bin 60 is in mechanical communication with shredder outlet 30, and receives shreddant 50. As cutting block 25 is operated, shreddant 50 falls out of outlet 30 into waste bin 60. As shreddant 50 reaches a predetermined, bin-full level in waste bin 60, bin-full sensor 40 can detect the bin-full level, and send bin-full signals to controller 70. Controller 70 can cause electric motor 45 to stop until waste bin 60 is emptied and the empty waste bin is returned to a selected position beneath outlet 30. Bin-full sensor 40 can be an electromechanical sensor disposed on the shredder outlet 30. In general, the predetermined, bin-full level of the shredder is a selected shreddant level in waste bin 60, which is below the position of cutting block 25. In FIG. 1, bin-full sensor 40 is shown rotated 90° around a longitudinal axis of shredder 100, for clarity.

Figure 2:
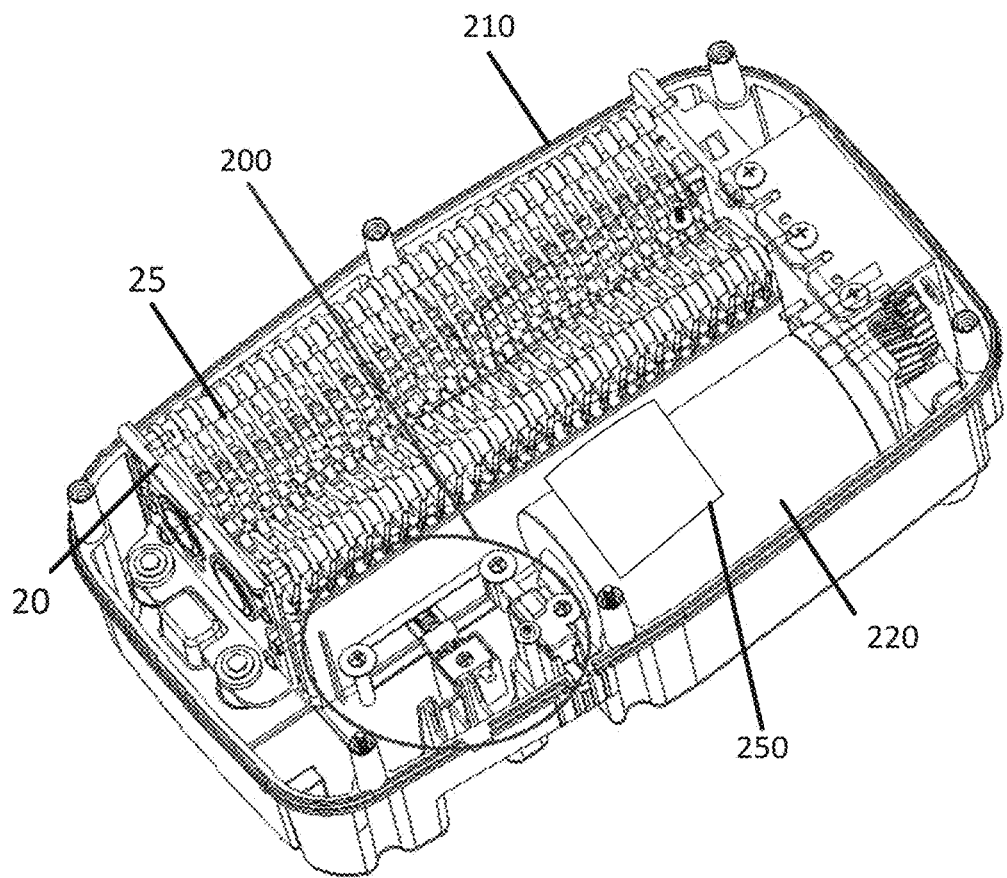
FIG. 2 is a perspective illustration of an inverted shredder lower shroud, in accordance with the teachings of the present invention.

FIG. 2 illustrates a configuration of shredder 100 shown without waste bin 60. Further, a cover (not shown) for bin-full sensor 200 has been removed for clarity. In FIG. 2, shredder element 20 is shown inverted and disposed in a shredder lower shroud 210. Bin-full sensor 200 can be functionally similar to Bin-full sensor 40 in FIG. 1. Bin-full sensor 200 can be disposed in shredder lower shroud 210, and may be adjacent to shredder outlet 30. Electric motor 220 can be coupled to cutting block 25, such that cutting block 25 shreddingly rotates when motor 220 is operating, causing the shreddables 15 to be comminuted into shredded material (shreddant) 50. Controller 250 can be disposed proximate to electric motor 220 and lower shroud 210.

Figure 3:
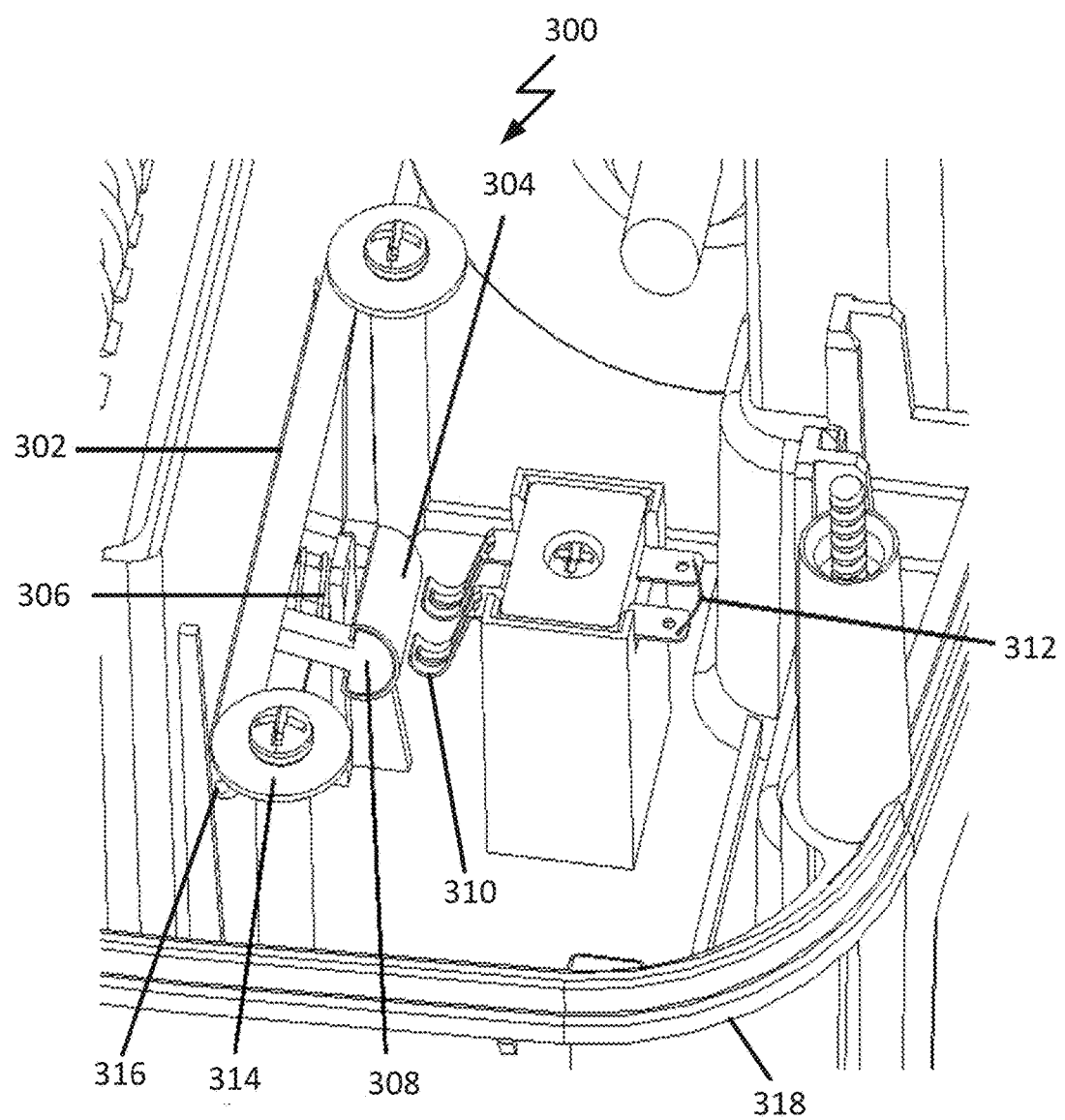
FIG. 3 is a portion of the view of FIG. 2, showing a bin-full sensor, in accordance with the teachings of the present invention.

FIG. 3 illustrates bin-full sensor 300, which may be similar to bin-full sensor 200, depicted in FIG. 2. Further, a cover (not shown) for bin-full sensor 300 has been removed for clarity. Bin-full sensor 300 is an embodiment depicted to have push bar 302, which is disposed to be in intermittent contact with shreddant (not shown), which may accumulate in the waste bin (not shown) during shredder operation. Push bar 302 can have an obverse side and a reverse side. Push bar 302 may be rectangular or square, or generally rectilinear in shape, although other shapes may be used. Push bar 302 can be disposed to move pivotingly using pivot portion 316. Push bar 302 can be coupled to conductive element 304 using push bar sweeper 308. Push bar sweeper 308 can be biased to facilitate operation, for example, using biasing mechanism 306, which may be a spring or other resilient element, and which may be captured at least in part, by push bar sweeper 308. The push bar sweeper can have a near end and a far end, with the far end being coupled to being attached to the reverse side of push bar 302. The near end of push bar sweeper 308 can be coupled to conductive element 304. In the example shown in FIG. 3, conductive element 304 at least partially envelopes a surface of push bar sweeper 308. Sensing contact assembly 310 can be disposed to electrically contact conductive element 304, for example, when push bar 302 and push bar sweeper 308 are compelled toward sensing contact assembly 310. Signaling contacts 312 can supply electrical energization of sensing contact assembly 310, such that contact with conductive element 304 completes an electrical circuit with the shredder controller 250, indicating the bin-full status of the waste bin (not shown). Push bar pressing screws, such as illustrated by screw 314, can bias push bar 302 towards lower shroud 318, thereby applying a pressing force to pivot portion 316.

Figure 4:
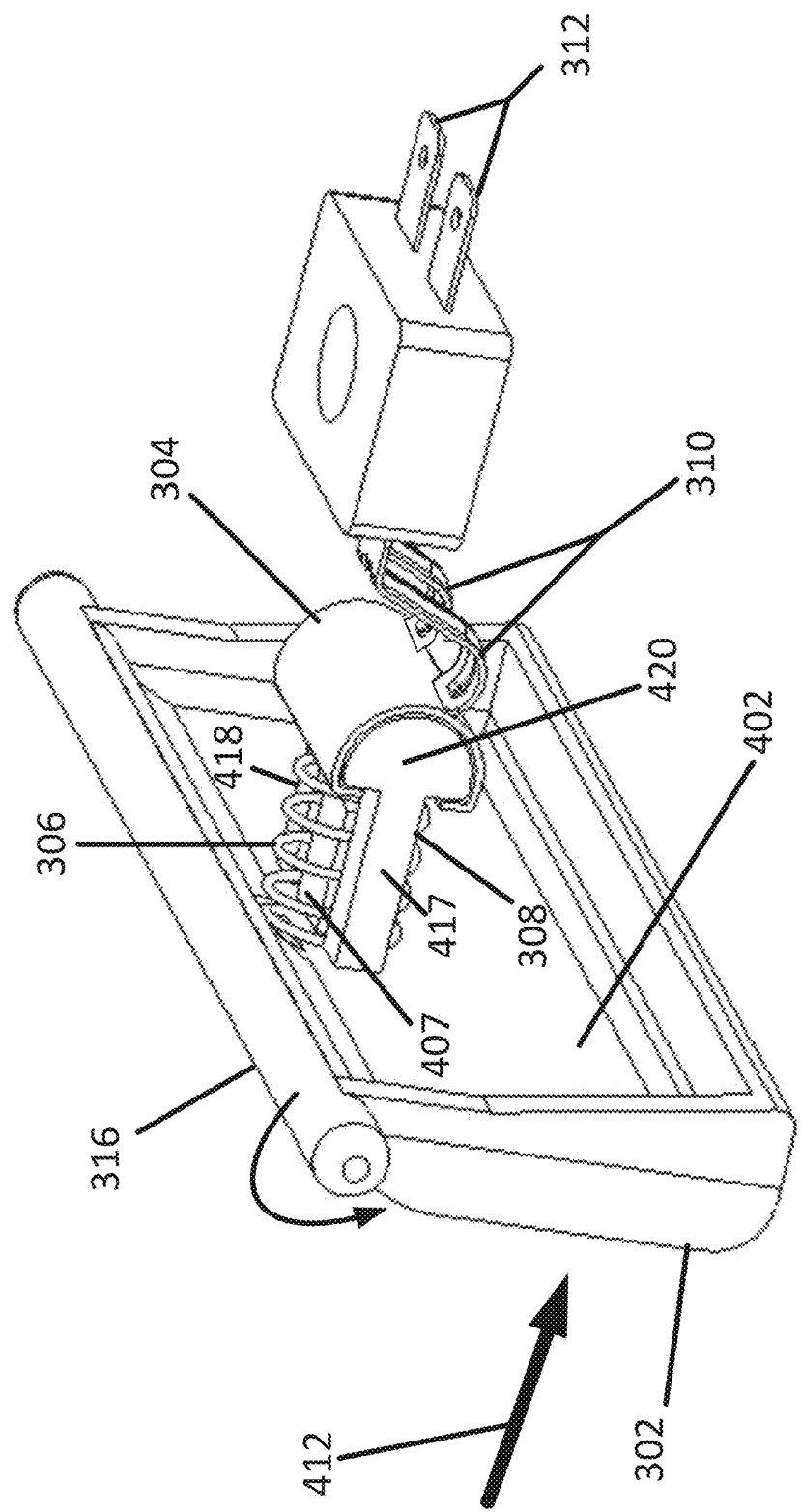
FIG. 4 is a perspective view of an embodiment of an electromechanical sensor, in accordance with the teachings of the present invention.

FIG. 4 provides a perspective view of the embodiment of bin-full sensor 300, shown in FIG. 3, but removed from lower shroud 318 and sensor cover (not shown), and not in contact with supporting structures. Elements of bin-full sensor 300 include push bar 302, conductive element 304, biasing mechanism 306, push bar sweeper 308, sensing contact assembly 310, signaling contacts 312, and pivot portion 316. Also shown are reverse portion 402 of push bar 302, to which biasing mechanism 306 and push bar sweeper 308 are coupled. In addition, capture rod 407 can be used when a biasing spring is used for biasing mechanism 306. Capture rod 407 can add stability and guidance to an expanding-type of biasing mechanism 306. Push-bar sweeper 308 may be structured as a dual-pronged rod with capture rod 407 disposed therebetween. Push bar sweeper 308 may include dual prongs 417, 418, each with expanded portion 420 on the near end distal to the reverse face 402 of push bar 302. Expanded portion 420 of each prong can be at least partly covered by conductive element 304. Biasing mechanism 306 can be disposed between prongs 417, 418 and capture rod 407. In an alternative embodiment, prongs 417, 418 may be composed of a substance sufficiently conductive, so that conductive element 304 can be eliminated.

In operation, as comminuted shreddant (not shown) builds up in the waste bin (not shown), a force 412 may be generated by the shreddant against push bar 302. Force 412 can cause pivoting portion 316 to rotate, advancing conductive element 304 towards conductive sensing contact assembly 310. When conductive element 304 contacts sensing contact assembly 310, an electrical circuit can be formed, sending a "bin-full" signal to the shredder controller (not shown). Such operation is insensitive to dust and dirt fouling the bin-full sensor, and exhibits high sensitivity, repeatability, and reliability for a bin-full condition, unlike current bin-full sensors.

Figure 5:
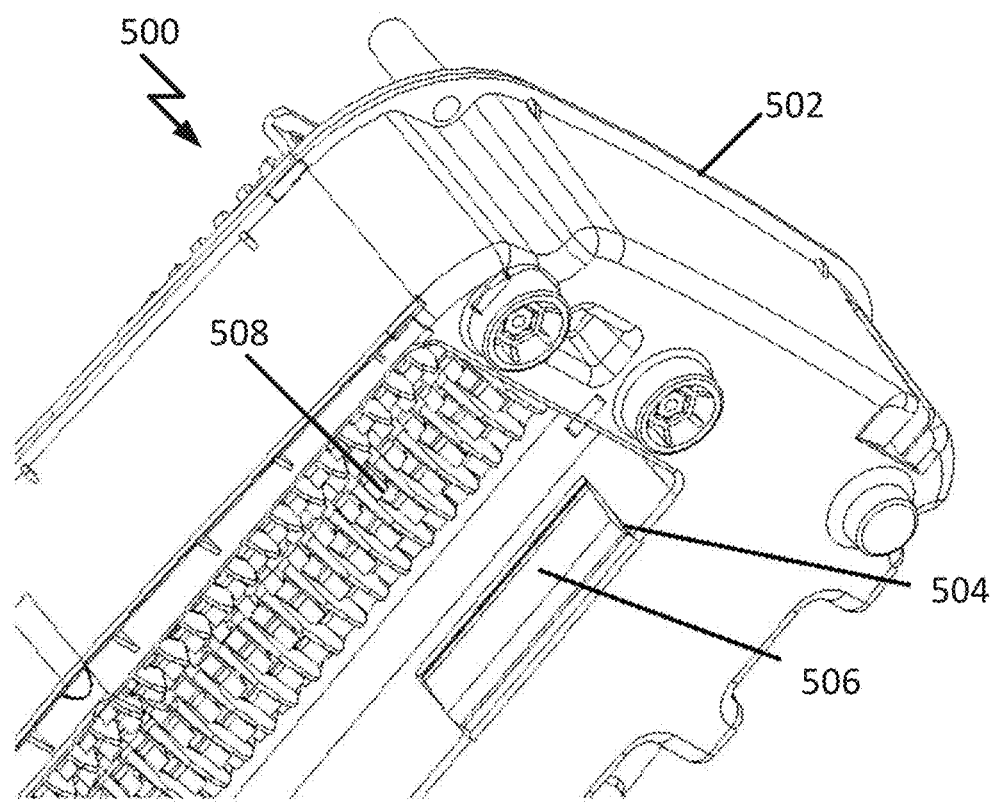
FIG. 5 is a perspective view of the obverse of the shredder lower shroud of FIG. 2, illustrating a location of an embodiment of the bin-full sensor, in accordance with the teachings of the present invention.

FIG. 5 illustrates shredder body 500, which can include with cutting block 508, a bin-full sensor, such as, without limitation, bin-full sensor 200, 300, and 400. FIG. 5 is illustrated from a perspective below lower shroud 502, looking upward. Shredder body 500 can include lower shroud 502, having opening 504 therein. Cutting block 508 includes a plurality of cutting blades. Within opening 504 can be push bar 506. Push bar 506 can be functionally like push bar 302, although other functionally similar implementations of push bar 302, 506 can be contemplated. Note that the opening 504 for push bar 506 can be disposed generally "below" shredder cutting block 508, so that sensor push bar 506 can detect a full waste bin before the shreddant reaches the blades of cutting block 508. In this context, a "full" waste bin is considered a waste bin with a predetermined level of shreddant below the level of the blades of cutting block 508. As waste builds up in the bin, the shredded material can exert a shredded material force, corresponding to a level in the waste bin. When the waste bin (not shown) is "full" the shreddant can press against push bar 506 with a predetermined shredder material force corresponding to the predetermined level of shreddant, causing push bar 506 to retreat into opening 504 and, by extension, causing the emanation of a bin-full signal.

Figure 6A:
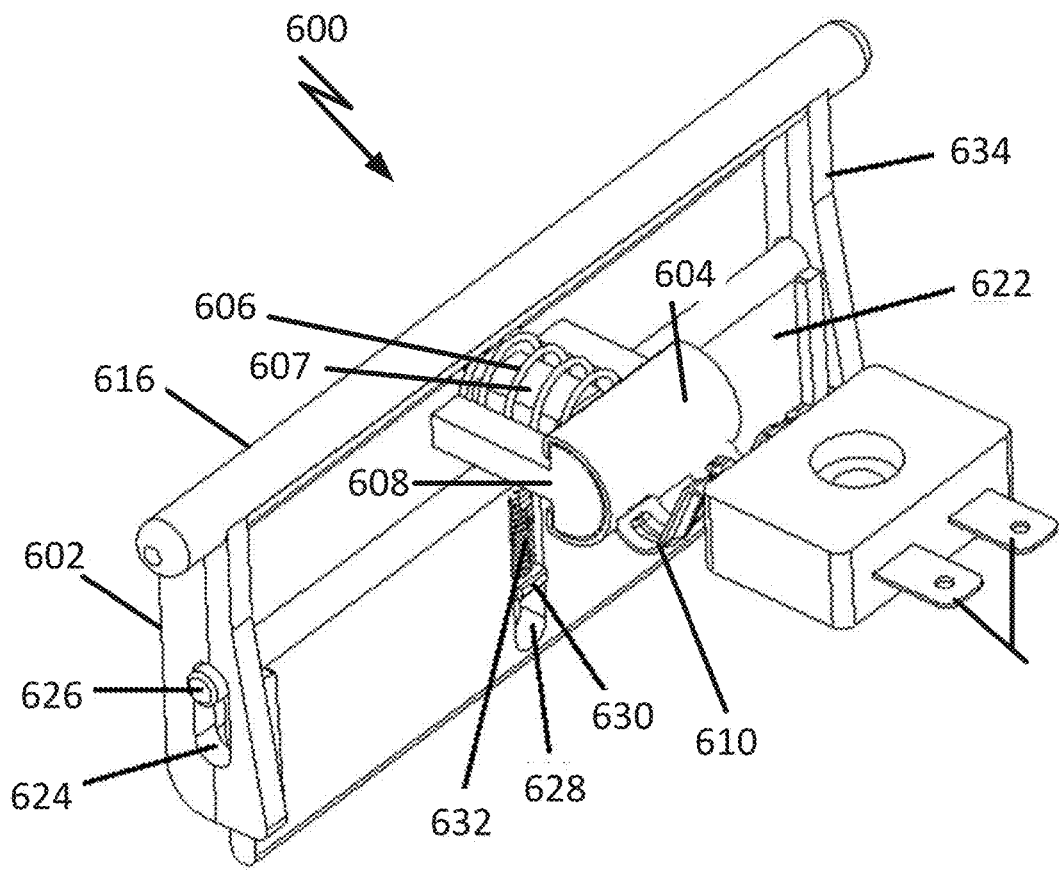
FIG. 6A is a perspective view of an embodiment of an articulated bin-full sensor, in accordance with the teachings of the present invention.
Figure 6B:
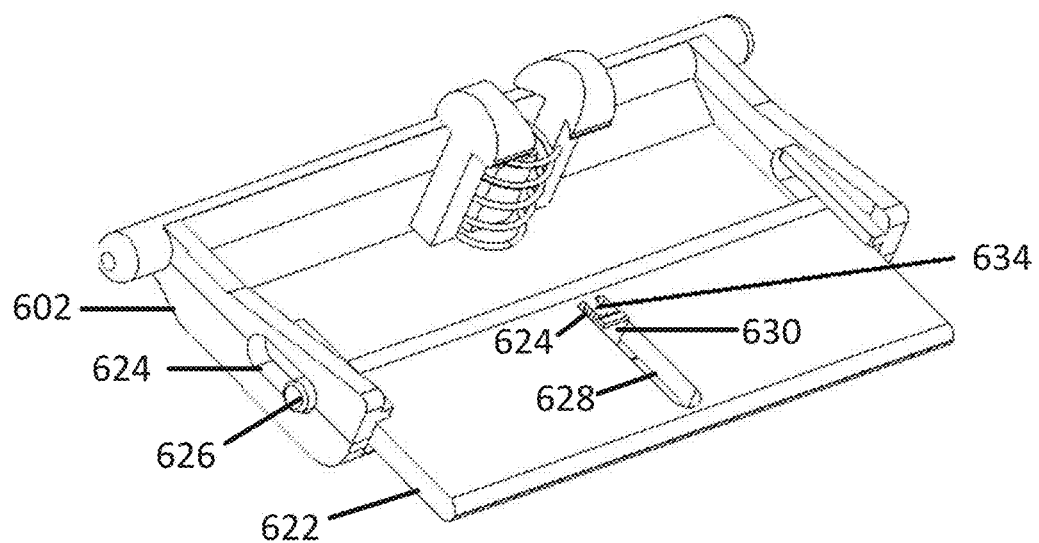
FIG. 6B is another perspective view of the sensor of FIG. 6A, having an extended sensor portion, in accordance with the teachings of the present invention.

FIGS. 6A-B depicts an alternative embodiment of bin-full sensor 600, in which push bar 602 can be articulated. Similar to bin-full sensor 300, bin-full sensor 600 can includes capture rod 607 coupled to push bar sweeper 608, the latter being covered at least in part by conductive element 604. Capture rod 607 can be disposed within biasing element 606, which can be implemented with a helical spring. When the level of shreddant in the waste bin (not shown) approaches a predetermined level, pivoting portion 616 is caused to rotate, advancing conductive element 604 towards conductive sensing contact assembly 610. When conductive element 604 contacts sensing contact assembly 610, an electrical circuit can be formed, sending a "bin-full" signal to the shredder controller (not shown) via signaling contacts 612.

In this alternative embodiment, push bar 602 can be articulated with lower push bar 622, which also is coupled with, and employs, lower pivoting portion 626. Side panel 634 is disposed on opposite ends of push bar 602, and can be used to form guiding slot 624, into which lower pivoting portion 626 is positioned. Tensioning slot 628 may be disposed generally perpendicularly to a longitudinal axis of upper push bar 602 and may be formed into lower push bar 622. Lower push bar 622 may be extended from or retracted to upper push bar 602. Tensioning element 632 can be disposed within tensioning slot 628, and constrained to longitudinal motion by tensioning constraint 630. Tensioning constraint 630 may be provided by a tongue-like protrusion from push bar 602. As shown in FIG. 6A, tensioning element 632 can be positioned and held in place by tensioning constraint 630, such that lower push bar 622 can be in a retracted position relative to push bar 602.

In FIG. 6B, bin-full sensor 600 is shown in the context of an articulated push bar, without conductive element 604, conductive sensing contact assembly 610, and signaling contacts 612 for clarity. Bin-full sensor 600 can be shown in an alternative arrangement in which tensioning element 632 can be extended and held in place by tensioning constraint 630, such that lower push bar 622 can be in an extended position relative to push bar 602. In FIG. 6B, lower push bar 622 is depicted as being extended from upper push bar 602. Here, lower pivoting portion 626 is disposed in the lower section of guiding slot 624. Also, lower biasing element 632 can be compressed by tensioning constraint 630, and can be disposed in slot upper portion 634 of tensioning slot 628. Slot upper portion 634 can be concave with a central protrusion, which may stabilize tensioning element 632.

Lower push bar 622 can be constrained from rotating, relative to push bar 602. The configuration illustrated in FIG. 6B illustrates that the stroke of upper push bar 602 can be increased by lower push bar 622, providing greater control over the setpoint for the predetermined level of shreddant in the waste bin. The further that lower push bar 622 is extended, the lower the predetermined level of shreddant in the waste bin will be to trigger a "bin-full" signal.

Figure 7A:
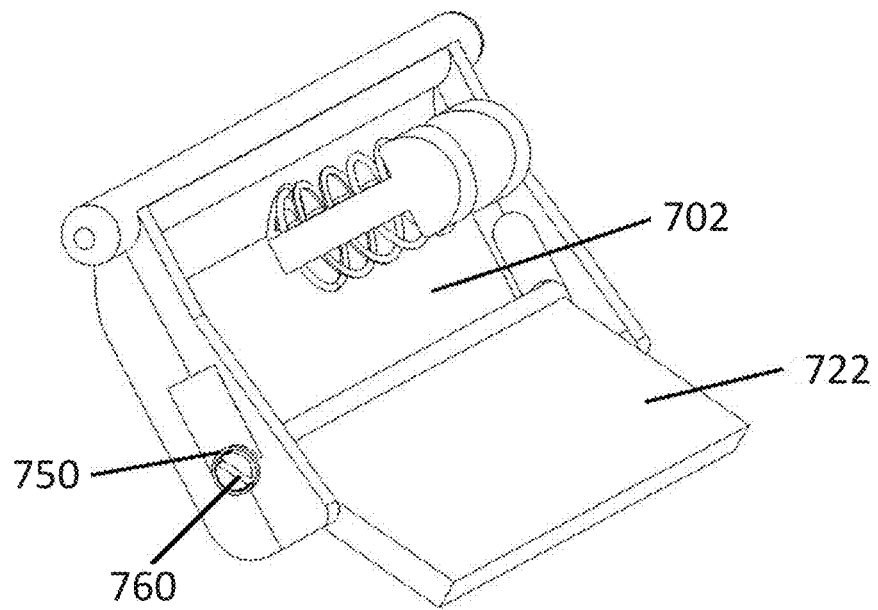
FIG. 7A is a perspective view of another embodiment of an articulated bin-full sensor with an angled extension, in accordance with the teachings of the present invention.
Figure 7B:
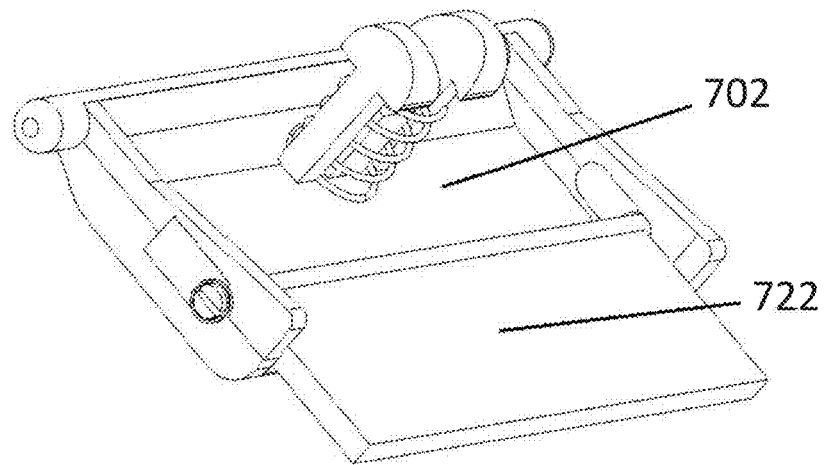
FIG. 7B is another view of the sensor of FIG. 7A with a straight extension, in accordance with the teachings of the present invention.

FIGS. 7A-B illustrates an articulated push bar, in which upper push bar 702 and lower push bar 722 can be biased by means of tensioning element 760, which may include, for example, a screw and a tensioning spring. In this embodiment, the side panel does not have a guiding slot but, instead, a guiding hole 750. In FIG. 7A, lower push bar 722 can be held in angled position, relative to upper push bar 702 by tensioning element 760. In FIG. 7B, lower push bar 722 can be held in a non-angled position, relative to upper push bar 702. This embodiment also can provide greater control over the setpoint for the predetermined level of shreddant in the waste bin. The further that lower push bar 722 is extended, the lower the predetermined level of shreddant in the waste bin will be to trigger a "bin-full" signal.

The examples used herein are intended merely to facilitate an understanding of ways in which the invention may be practiced and to further enable those of skill in the art to practice the embodiments of the invention. Accordingly, the examples and embodiments herein should not be construed as limiting the scope of the invention, which is defined solely by the appended claims and applicable law. Moreover, it is noted that like reference numerals represent similar parts throughout the several views of the drawings, although not every figure may repeat each and every feature that has been shown in another figure in order to not obscure certain features or overwhelm the figure with repetitive indicia. It is understood that the invention is not limited to the specific methodology, devices, apparatuses, materials, applications, etc., described herein, as these may vary. It is also to be understood that the terminology used herein is used for the purpose of describing particular embodiments only, and is not intended to limit the scope of the invention.

What is claimed is:

1. A paper shredder, comprising:
   a motor;
   a cutting block mechanically coupled to the motor;
   a shredder controller electrically coupled to the motor, the shredder controller configured to receive a bin-full signal; and
   a bin-full sensor electrically coupled to the shredder controller, having
   a push bar having an obverse side and a reverse side,
   a conductive element mechanically coupled to the reverse side of the push bar,
   a sensing contact assembly adjacent to and set apart from the conductive element,
   a signaling contact electrically coupled to the sensing contact assembly,
   a push bar sweeper coupled between the reverse side of the push bar and the conductive element, the push bar sweeper having a near end and a far end, wherein the far end is coupled to the reverse side of the push bar, and
   a biasing element coupled to the push bar sweeper far end, wherein the biasing element elastically resists a shredded material force,
   wherein the shredded material force corresponds to a predetermined waste bin level and presses the obverse side of the push bar, causing the conductive element to electrically couple to the sensing contact assembly, in turn causing the bin-full signal to emanate from the signaling contacts and to be received by the controller, wherein the motor is stopped.

2. The paper shredder of claim 1, further comprising:
   a lower shroud mechanically coupled to the motor, the cutting block, and the controller;
   an opening in the lower shroud, formed to accommodate the push bar; and
   a waste bin removably coupled to the lower shroud,
   wherein the push bar extends at least in part from the opening in the lower shroud, and wherein when shredded material reaches a predetermined level in the waste bin, the push bar is positioned to cause the bin-full signal to emanate from the signaling contacts.

3. The paper shredder of claim 2, wherein the push bar comprises a non-articulated push bar.

4. The paper shredder of claim 2, wherein the push bar comprises an articulated push bar.

5. The paper shredder of claim 4, wherein the articulated push bar comprises:
   an upper push bar with a guide slot;
   a lower push bar mechanically coupled to the upper push bar using the guide slot; and
   an adjustable tensioning element disposed in the lower push bar, wherein the lower push bar is extended from or retracted to the upper push bar by adjusting the adjustable tensioning element.

6. The paper shredder of claim 4, wherein the articulated push bar comprises:
   an upper push bar with a guiding hole;
   a lower push bar mechanically coupled to the upper push bar using the guiding hole; and
   an adjustable tensioning element positioned at least partially through the guiding hole into the lower push bar, wherein the lower push bar is angled relative to the upper push bar by adjusting the adjustable tensioning element.

* * * * *